May 29, 1923.
G. J. SHAVE
PASSENGER VEHICLE
Filed March 22, 1921
1,457,190
6 Sheets—Sheet 3
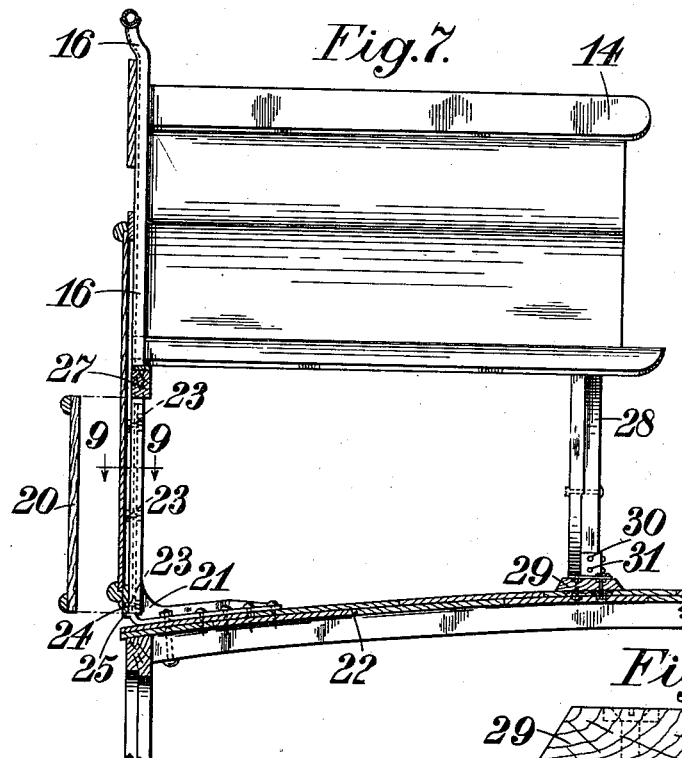
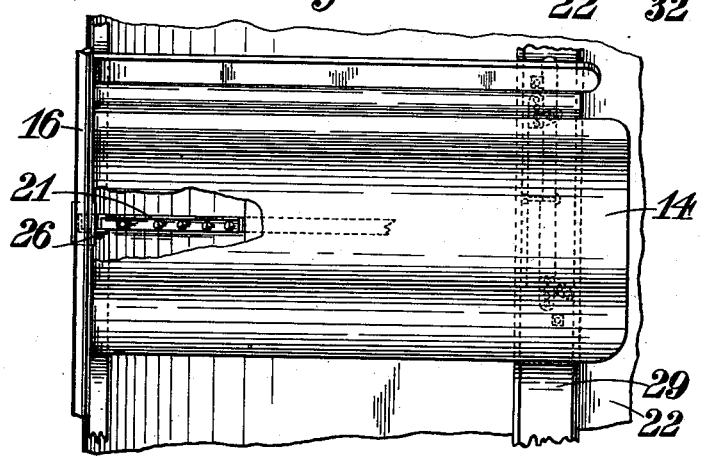
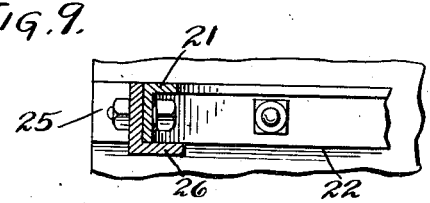

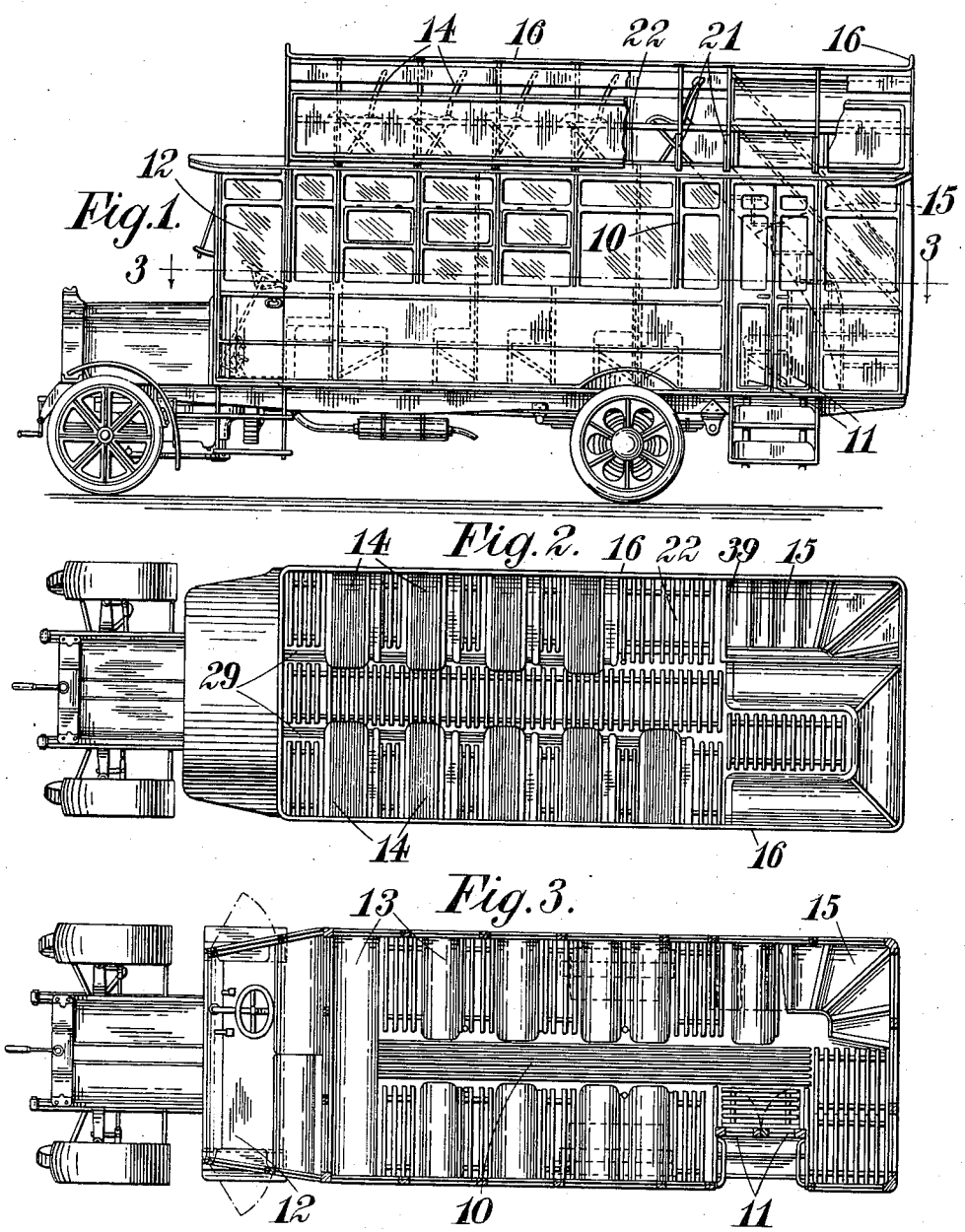

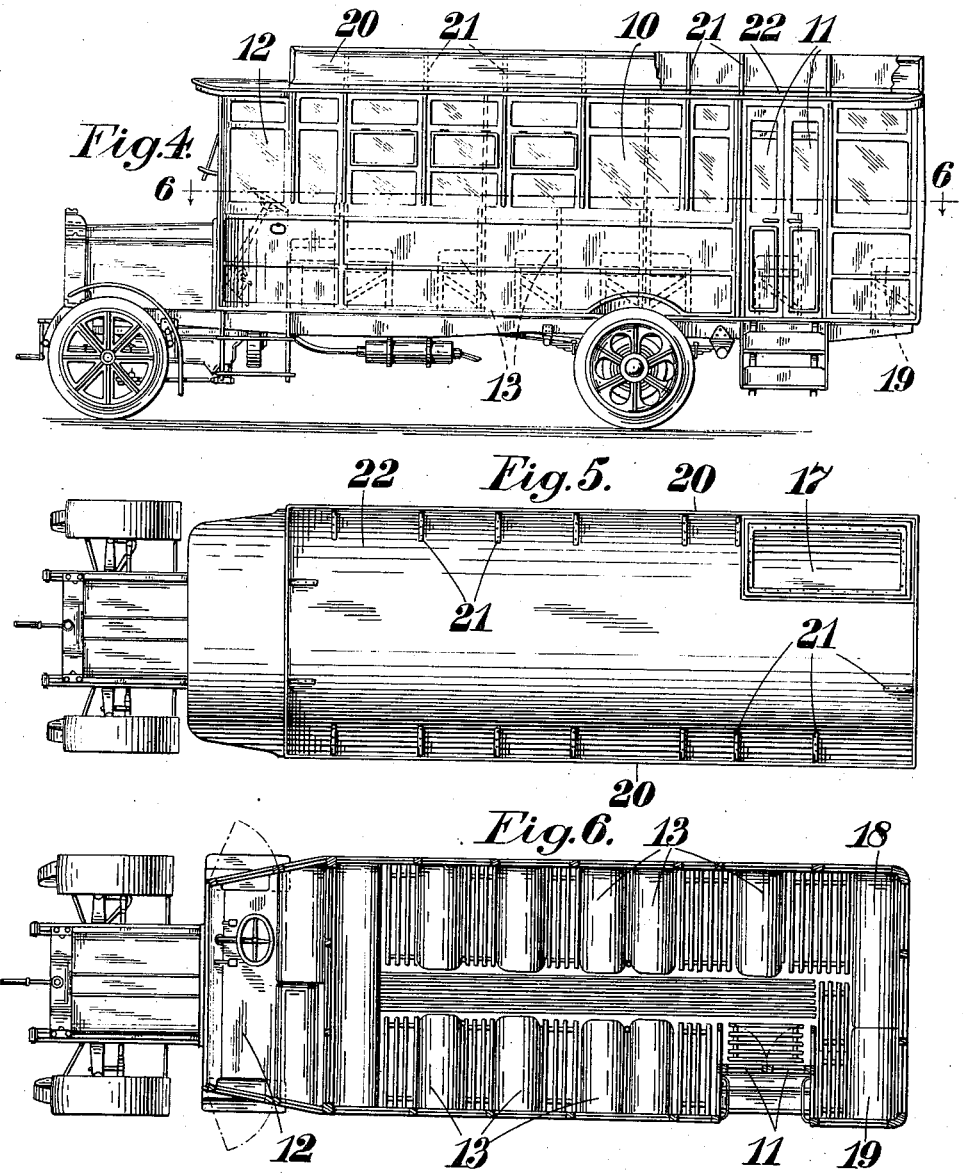

May 29, 1923.

G. J. SHAVE

PASSENGER VEHICLE

Filed March 22, 1921

Inventor
George James Shave
by Bakewell, Byrnes Parmelee
his atty.

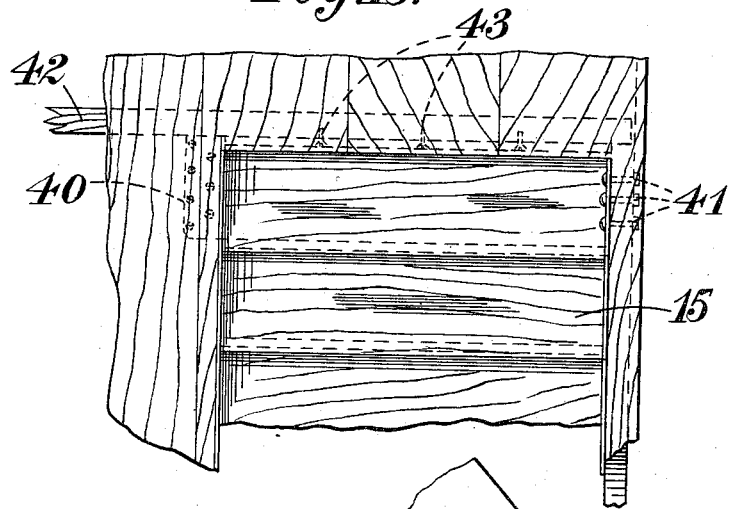
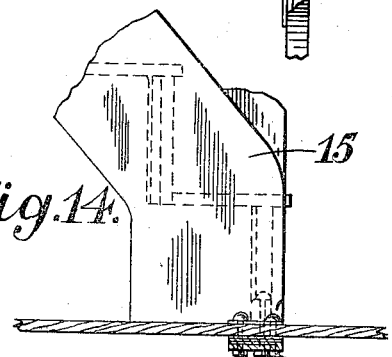
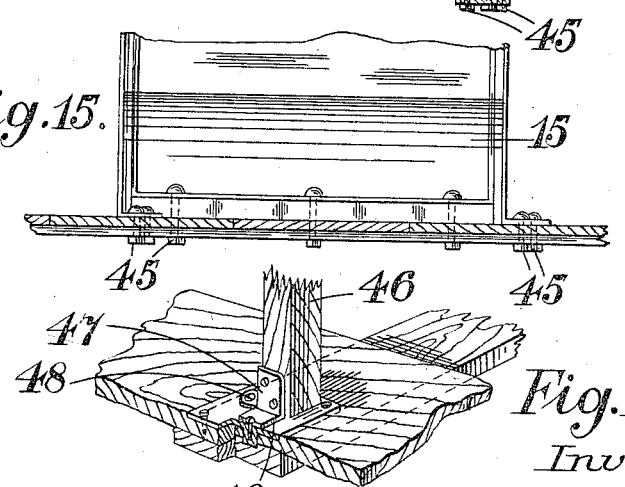

May 29, 1923.

G. J. SHAVE

PASSENGER VEHICLE

Filed March 22, 1921

Patented May 29, 1923.

1,457,190

UNITED STATES PATENT OFFICE.

GEORGE JAMES SHAVE, OF WESTMINSTER, LONDON, ENGLAND, ASSIGNOR TO THE LONDON GENERAL OMNIBUS COMPANY LIMITED, OF WESTMINSTER, LONDON, ENGLAND, A BRITISH LIMITED LIABILITY COMPANY.

PASSENGER VEHICLE.

Application filed March 22, 1921. Serial No. 454,465.

*To all whom it may concern:*

Be it known that I, GEORGE JAMES SHAVE, a subject of the King of England, residing at Westminster, London, England, have invented certain new and useful Improvements in Passenger Vehicles, of which the following is a specification.

This invention is for improvements in or relating to passenger vehicles and has for one of its objects to provide a construction which shall be readily adaptable to suit varying conditions of climate, roads and country.

According to the primary feature of the present invention there is provided a passenger vehicle having seats for passengers inside, and on the roof of, the body, and having a staircase communicating with the roof, which vehicle is characterized in that said staircase and the roof seats (with or without other roof superstructure) are readily removable. Thus, the vehicle can be easily converted from the double decker type to the single decker type, and of course back again. In countries, therefore, where the winter is particularly severe, and it is impossible for passengers to ride on the outside of the vehicle during that period, the vehicle can be converted to the single decker type and then reconverted when more favourable weather conditions return. Or the invention may prove of utility in connection with cases in which a service of passenger vehicles has to be established along a road having a tunnel or other obstruction through which it is impossible to drive a double decker vehicle. In these circumstances a sufficient number of the double decker vehicles could be quickly converted for establishing the service. Other circumstances in which the convertibility of the vehicle will be of advantage also may occur.

According to another feature of the invention the staircase leads upwards from an enclosed portion of the interior of the body to a cut-away portion of the roof, and a readily detachable cover is provided for closing said cut-away portion when the staircase is removed. Thus the interior of the body will be maintained closed.

Conveniently, readily detachable seats are provided for mounting on the floor of the body in substitution for the staircase when the latter is removed, and preferably the roof seats are each partly supported by an upstanding railing extending around the periphery of the roof and carried upon, but readily removable from, permanent stanchions projecting above the roof. Readily removable advertisement or other boards may be provided for mounting on said stanchions in substitution for the upstanding railing when the latter is removed.

According to a further feature of the invention a plurality of roof seats are arranged in a row each with a supporting leg secured to a single slat which is itself secured to the roof in a readily detachable manner. Thus, not only is the removal of the roof seats facilitated since the points of connection to the roof need be fewer, but the great advantage is obtained of there having to be less screw or other holes in the roof and thus the latter is less likely to become leaky.

For a more complete understanding of the invention there will now be described, by way of example only and with reference to the accompanying drawings, one construction of convertible passenger vehicle according to the invention. It is to be understood, however, that the invention is not limited to the precise constructional details set forth.

In these drawings—

Figure 1 is a side elevation of a double decker passenger vehicle;

Figure 2 is a plan thereof, and

Figure 3 a cross-section on the line 3—3 of Figure 1.

Figure 4 is a side elevation of a single decker passenger vehicle;

Figure 5 is a plan thereof, and

Figure 6 is a cross-section on the line 6—6 of Figure 4;

Figure 7 is a detail view, on a scale larger than that of the preceding figures, of a roof seat and certain parts adjacent thereto;

Figure 8 is a plan of the parts shown in Figure 7;

Figure 9 is a cross-section on the line 9—9 of Figure 7, on a scale larger than that of this latter figure. In Figure 9 certain parts are assumed to be removed.

Figure 11:
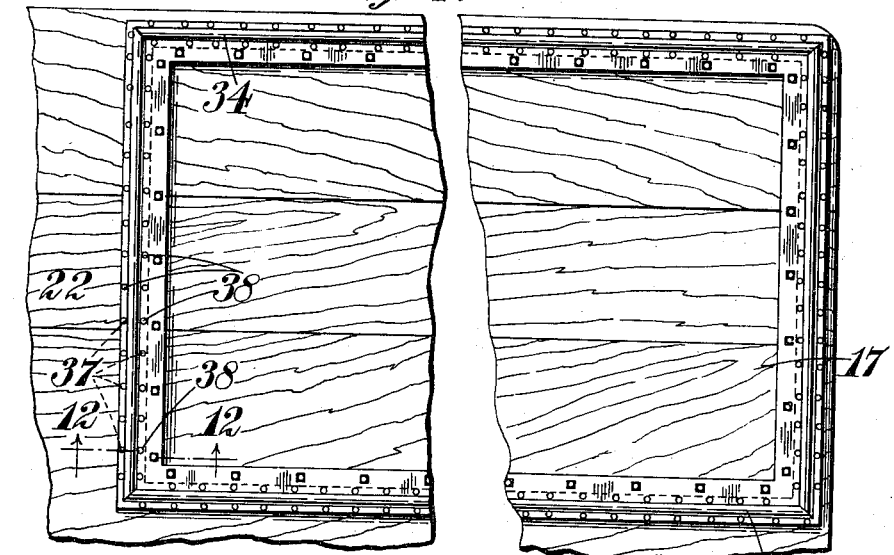

Figure 10 is an enlarged cross-section of certain parts shown in Figure 7;

Figure 11 is a plan, on a scale larger than that of Figures 1–6 of a cover fitted to the cut-away portion of the roof through which the staircase delivers.

Figure 12:
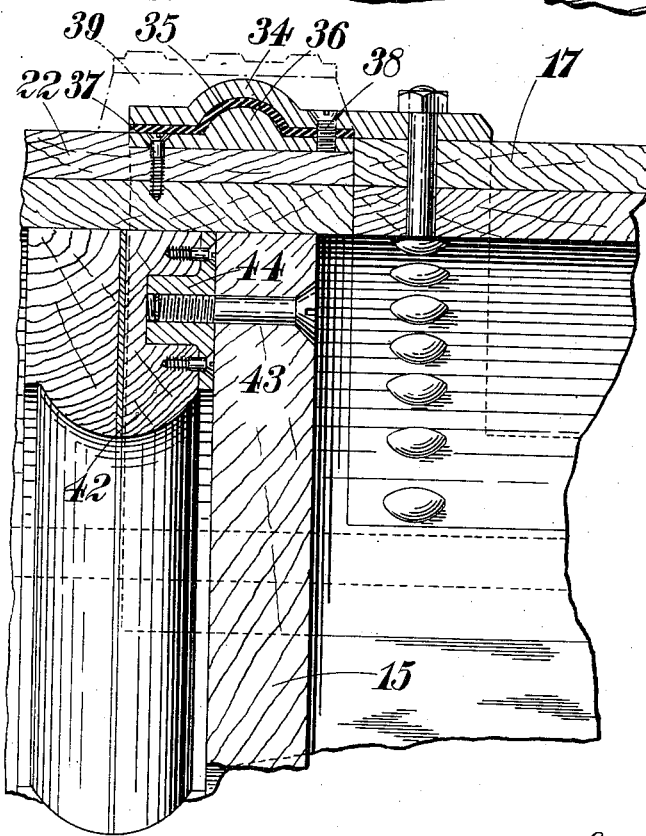

Figure 12 is a cross section, on an enlarged scale, on the line 12—12 of Figure 11;

Figure 13 is a detail plan view of the upper portion of the staircase and certain parts adjacent thereto, other parts being assumed to be removed for the sake of clearness;

Figure 14 is an end view of a portion of the foot of the staircase, and

Figure 17:
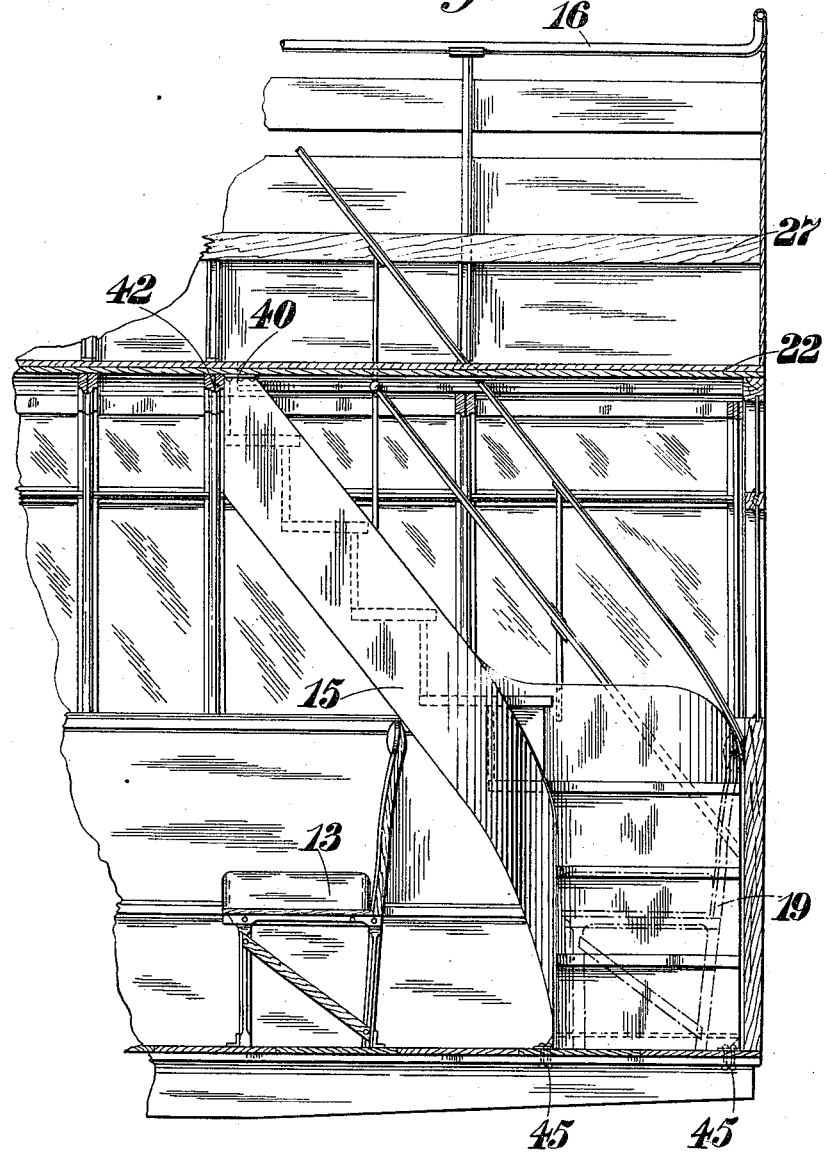

Figure 15 is a side view thereof,

Figure 16 is a perspective view of the fittings for the base of the leg of a seat employed in the interior of the body of the vehicle, and Figure 17 is a side view, on a scale larger than that of Figures 1–6, of a rear portion of the interior of the vehicle. In this Figure the parts shown in chain lines are fitted when the vehicle is to be used as a single decker.

Like reference numerals indicate like parts throughout the drawings.

Referring first of all to Figures 1–3, the passenger vehicle therein illustrated comprises a body 10 fitted on its near side with a pair of swing doors 11. The body is completely enclosed and at its forward end there is a closed compartment 12 for the driver. The compartment 12 may also be used for the reception of passengers, if desired. The passenger seats in the interior of the body are indicated at 13 and those on the upper deck or roof of the body at 14. A staircase 15 leads from the floor of the body to the roof thereof, and the latter is surrounded by a railing 16. When it is desired to convert the double decker vehicle illustrated in Figures 1–3 into a single decker, as illustrated in Figures 4–6, the seats 14, the starcase 15, and railings 16 are removed. A cover 17 is placed over the aperture through which the staircase 15 delivers to the roof of the vehicle, extra seats 18 and 19 are mounted in the interior of the vehicle towards the rear thereof and advertisement or other boards 20 fitted in place above the roof of the vehicle. This is a preferred mode of effecting the conversion but obviously it is not essential to remove the railings 16 nor to fit the seats 18 and 19 or the boards 20, but where, as illustrated, a completely enclosed body is employed, it will usually be considered advisable to fit the cover 17.

It will be understood that in order to effect the conversion from one type of vehicle to the other, the various parts affected must be so constructed as to be capable of being easily mounted in place and dismounted. The method of mounting the upper deck seats 14 and the railings 16 in position is illustrated in Figures 7–10. Upwardly extending stanchions 21 are permanently secured by bolts, screws or other means to the upper deck 22 of the body. These stanchions 21 may conveniently be formed of angle iron and they are intended to be left in place after the seats 14 and railings 16 have been removed so as to form a support for the boards 20. Upright members of the railings 16 are bolted to the upright parts of the stanchions 21 as indicated at 23 and a longitudinal rail 24 towards the bottom edge of the railings 16 is supported by a lip 25 on the stanchions. Conveniently, the upright members of the railings which are bolted to the stanchions are also of angle iron as illustrated at 26 in Figure 9.

In addition to the longitudinal rail 24, the railings 16 also carry a longitudinal rail 27 situated higher up and this longitudinal rail is employed to assist to support the seats 14. The seats are also supported by legs 28 which are secured to the deck 22. For this purpose long slats 29 are provided to which a plurality of seat legs 28 are permanently secured by angle members 30 and screws or the like 31. The slat 29 is itself secured to the deck 22 in a readily detachable manner so that when its fastenings have been taken off and the bolts 23 removed the seats 14, railings 16 and slat 29 can be moved bodily. For securing the slat 29 in place, a number of metal sockets 32 are housed in the deck 22 and secured in place therein. These sockets 32 are formed with threaded holes to receive screws 33 passing downwardly through the slat 29. Thus to remove the slat it is only necessary to take out the screws 33 which being received in metal sockets can readily be replaced again when the slat is to be refixed. Referring to Figure 2 it will be seen that there is a slat 29 running longitudinally along the upper deck of the vehicle under each of the two rows of seats 14, this being the preferred arrangement.

The cut-away portion or aperture in the upper deck 22 through which the staircase 15 delivers, is closed by a cover 17 when the vehicle is to be used as a single decker. The cover 17 has around its edges a projecting closure member 34 of curved formation with a suitable rubber or other lining 35. This closure member fits over a permanent ridge plate 36 also extending around the edges of the cut-away portion in the upper deck. The ridge plate 36 is secured in place by screws 37 and the cover 17 is secured in place by screws 38 which are received in threaded holes in the edges of the ridge plate 36. Thus, when the closure plate 34 is drawn down by its screws towards the ridge plate 36 the packing 35 will provide a tight joint and prevent a leakage into the interior of the body. In Figure 12 there is shown in chain lines a slat 39 which is secured in position over the ridge plate 36 when the cover 17 is not in use.

The staircase 15 is preferably formed as a single unit. It is secured in place at its upper end by an angle plate 40 at one side and bolts 41 at the other side. Its top riser, is furthermore secured to one of the hoop sticks 42 of the body by set screws 43 received in socket plates 44, see particularly Figure 12. At its lower end the staircase is secured to the floor of the body by bolts 45.

In Figure 17 the staircase is shown in operative position, while in chain lines is shown a detachable seat 19 which, see also Figures 3 and 6, is fitted in place when the staircase is removed. A convenient method of securing the legs of the seats 18 and 19 in position is shown in Figure 16. The lower portion of the leg 46 therein shown is provided with an angle plate 47 having screws 48 whereby it may be secured to a metal socket plate 49 which is permanently secured to the floor of the body. Thus, when the seat is required to be detached the screws 48 only have to be removed, the fastenings of the plate 49 being left intact.

From the foregoing description it will be appreciated that all of the fittings which have to be removed or mounted in place during the conversion are so constructed and arranged that the operation of effecting the conversion can be carried out in the minimum of time. Ease in manipulation is secured and the parts can be mounted and dismounted many times without deterioration.

What I claim as my invention and desire to secure by Letters Patent is:—

1. A passenger vehicle comprising in combination a body, permanent seats for passengers on said body, a staircase communicating between the floor and the roof of the body, readily removable means for securing the staircase in position, supplementary seats for mounting on the floor of the body in substitution for the staircase when the latter is removed, and readily removable means for securing said supplementary seats in position, said means including metal sockets sunk in the floor of the body, metal plates carried by a supplementary seat, and screws for securing said plates to said sockets.

2. A passenger vehicle comprising in combination a body, readily detachable seats for passengers arranged in a row on the roof of said body and each including a supporting leg, and readily removable means for securing said seats in position, said means including a single slat, means for securing each leg to said slat, and readily removable means for securing said slat to the roof.

3. A passenger vehicle comprising in combination a body, readily detachable seats for passengers arranged in a row on the roof of said body and each including a supporting leg, and readily removable means for securing said seats in position, said means including a single slat, angle plates for permanently securing each leg to said slat, and readily removable means for securing said slat to the roof.

4. A passenger vehicle comprising in combination a body, readily detachable seats for passengers arranged in a row on the roof of said body and each including a supporting leg, and readily removable means for securing said seats in position, said means including a single slat, angle plates for permanently securing each leg to said slat, and readily removable means for securing said slat to the roof, said means including metal sockets sunk in the roof and screws for securing said slat to said sockets.

5. The combination, with the enclosed body of a single-deck passenger-vehicle having a hatchway for passengers in its roof opening into the interior of the body, of a stair-case readily detachably fixed in the interior of said body leading from the floor thereof to said hatchway, a plurality of stanchions fixed spaced apart on the roof at the periphery thereof, a railing readily attachably carried by said stanchions, a slat disposed longitudinally of the vehicle and readily detachably attached to the roof, and a plurality of seats disposed transversely of the vehicle, each of which seats is supported at one end by said railing and has a leg at its other end secured to said slat.

In testimony whereof I affix my signature.

GEORGE JAMES SHAVE.